(12) United States Patent
Wray et al.

(10) Patent No.: US 8,243,738 B2
(45) Date of Patent: Aug. 14, 2012

(54) OR RELATING TO CALL CONTROL

(75) Inventors: Stuart Charles Wray, Broadstone (GB); Clive Ellis Jones, Christchurch (GB); Stephen Matthew Jenner, Christchurch (GB); Robert John Salter, Christchurch (GB)

(73) Assignee: BAE Systems plc, London (GB)

( * ) Notice: Subject to any disclaimer, the term of this patent is extended or adjusted under 35 U.S.C. 154(b) by 545 days.

(21) Appl. No.: 10/532,588

(22) PCT Filed: Feb. 25, 2005

(86) PCT No.: PCT/GB2005/050022
§ 371 (c)(1), (2), (4) Date: Jul. 15, 2005

(87) PCT Pub. No.: WO2005/086439
PCT Pub. Date: Sep. 15, 2005

(65) Prior Publication Data
US 2006/0146785 A1 Jul. 6, 2006

(30) Foreign Application Priority Data

Mar. 1, 2004 (EP) .................................. 04251182
Mar. 1, 2004 (GB) .................................. 0404576.1

(51) Int. Cl.
*H04L 12/28* (2006.01)
(52) U.S. Cl. ..................................... 370/395.2
(58) Field of Classification Search .................. None
See application file for complete search history.

(56) References Cited

U.S. PATENT DOCUMENTS 6,388,990 B1 * 5/2002 Wetzel ........................ 370/230

(Continued)

FOREIGN PATENT DOCUMENTS

EP 0 932 282 A2 7/1999

(Continued)

OTHER PUBLICATIONS

Viktoria Elek, Gunnar Karlsson and Rober Ronngren, "Admission Control Based on End-to-End Measurements", Mar. 26-30, 2000, IEEE, vol. 2, pp. 623-630.*

(Continued)

*Primary Examiner* — Otis L Thompson, Jr.
(74) *Attorney, Agent, or Firm* — Crowell & Moring LLP

(57) ABSTRACT

Described herein is a method of controlling call admission for packet switched networks, each network including at least two local area networks (50, 60) and a connecting network (70). The method comprises transmitting a burst 5 of trial data of the same size as the packet to be transmitted from a first node (52, 54) in a first local area network (50) to a second node (62, 64) in a second local area network (60) via the connecting network (70). The connecting network (70) comprises a plurality of routing nodes (72, 74, 76, 78, 80) for muting the burst of trial data of the same size as the packet to be transmitted from a first node (52, 54) in a first local area network (50) to second node (62, 64) in a second local area network (60) via the connecting network (70). The connecting network (70) comprises a plurality of routing nodes (72, 74, 76, 78, 80) for routing the burst of trial data to the second node in the second local area network along a particular path. The burst of trial data is reflected by the second node in the second local area network (60) back through the connecting network (70) to the first node in the first local area network (50). A comparison is carried out between the transmitted burst of trial data and the reflected burst of trial data to determine an estimate of packet loss rate of the path, and if the packet loss rate is acceptable a transmission of a continuous stream of data is initiated.

7 Claims, 3 Drawing Sheets

U.S. PATENT DOCUMENTS

| | | | |
|---|---|---|---|
| 6,452,905 B1 * | 9/2002 | Smith et al. | 370/236.1 |
| 6,697,378 B1 * | 2/2004 | Patel | 370/468 |
| 2002/0118648 A1 | 8/2002 | Zaencker | |
| 2004/0078460 A1 * | 4/2004 | Valavi et al. | 709/224 |
| 2005/0027861 A1 * | 2/2005 | Shah et al. | 709/224 |

FOREIGN PATENT DOCUMENTS

| | | |
|---|---|---|
| JP | 58-85654 | 5/1983 |
| KR | 2003-0023898 | 3/2003 |
| WO | WO 02/32097 A3 | 4/2002 |
| WO | WO 02/093894 A3 | 11/2002 |

OTHER PUBLICATIONS

Odom et al., (Cisco VoIP Call Admission Control, Aug. 2001).*

István Szabó: "Performance Evaluation of a New End-to-end-Measurement Baed Call Admission Control Scheme for Supporting IP Telephony"; ISBN: 1-56555-240-7; Orlando, Florida, Jul. 15-19, 2001—XP009020891, pp. 498-505.

* cited by examiner

OR RELATING TO CALL CONTROL

CROSS-REFERENCE TO RELATED APPLICATIONS

This application is relates to co-pending application Ser. No. 10/532,593, filed on Apr. 25, 2005 and Ser. No. 10/532, 594, filed on Apr. 25, 2005.

BACKGROUND OF THE INVENTION

The present invention relates to improvements in or relating to call control and is more particularly, although not exclusively, concerned with call admission.

In traditional telephony, that is, circuit switched telephony, for a call to be established between two remote telephones, that is, telephones connected to different local exchanges, signalling is used to establish a path prior to establishing the call itself. The path in the above example comprises initiating telephone to its local exchange, initiating local exchange to trunk connection, trunk connection to receiving local exchange, and receiving local exchange to receiving telephone. Here, the signalling and the call usually take the same path and there is full control of the path through each element in the path. As there is full control, it is relatively straightforward to determine whether a call between two telephones can be established or not.

In conventional internet protocol (IP) telephony, the local exchanges are replaced by local "gatekeepers" which communicate with one or more trunk gatekeepers to establish the path between the initiating telephone and the receiving telephone. Here, signalling is effected through the trunk gatekeeper(s) but the call does not take the same path. In this case, the trunk gatekeeper(s) control the bandwidth which can be used in establishing the call, and if the bandwidth is not sufficient, the call is not established.

With the advent of opaque trunk IP telephony, there is no gatekeeper in the IP network which forms the "trunk". As a result, there is effectively no control over being able to establish a call successfully. Here, the initiating telephone cannot be certain that a call, once established, will be successfully completed.

One known document, "Performance Evaluation of a New End-to-end Measurement Based Call Admission Control Scheme for Supporting IP Telophony" in PROCEEDINGS OF THE SYMPOSIUM OF PERFORMANCE EVALUATION OF COMPUTER AND TELECOMMUNICATION SYSTEMS, 15-19 Jul. 2001 pages 498-505, XP009020891, discloses a receiving gateway, positioned within a network, that is able to identify the gateway from which each frame/packet was sent and to which call each frame/packet belongs. The gateway checks each frame's sequence number to calculate whether any previous packets or frames have been lost, updating a packet loss counter accordingly. At the end of each predetermined measurement period, a control packet is sent to each sending gateway to inform the senders about the loss statistics of their calls. From the statistics reported to the receiving gateway in the control packet(s), the sending gateway can determine whether to reject or accept any new calls to a destination.

Another known document, European Patent Application No. EP 0 932 282 A, discloses an admission control apparatus having a connection request queue. All new connection requests are stored in this connection request queue, which operates on a first-in first-out basis unless admission control is invoked. The admission control detects any packet resends due to packet loss or discard. The admission control derives a pattern of these packet losses or discards, called a packet loss characteristic, to identify any patterns. If certain criteria are met, or the packet loss characteristic matches of pre-determined pattern, admission control is invoked and any new connection requests in the queue will be delayed or discarded, or existing connections will be discarded, until the condition clears.

SUMMARY OF THE INVENTION

It is therefore an object of the present invention to provide a method of call admission control that overcomes the disadvantages described above.

In accordance with one aspect of the present invention, there is provided a method of call admission control for a continuous stream of data in packet switched networks including at least two local area networks communicating to one another across a connecting network, the method comprising the steps of:

a) transmitting a burst of trial data from a first node in a first local area network through the connecting network to a second node in a second local area network;

b) reflecting the burst of trial data received at the second node back to the first node;

c) receiving the reflected burst of trial data at the second node through the connecting network; and d) comparing the reflected burst of trial data to the transmitted burst of trial data to determine whether transmission of a continuous stream of data can be initiated from the first node in the first local area network to the receiving node in the second local area network.

Advantageously, step a) includes selecting a path through the connecting network, the path being determined by the connecting network.

Preferably, the burst of trial data is the same size as the packets to be transmitted in the continuous stream of data.

The burst of trial data may be transmitted at the same data rate as the packets to be transmitted. Alternatively, the burst of trial data may be transmitted at a higher data rate than the packets to be transmitted.

In one embodiment of the present invention, step d) includes comparing the number of packets in the transmitted burst of trial data and the reflected burst of trial data, and calculating an estimate of packet loss rate of the path.

In this embodiment, multiple bursts of trial data may be transmitted to improve the estimate.

The method further comprises the step of:

e) deciding to transmit packet data based on an acceptable packet loss rate for the transmission of the continuous steam of data.

If the packet loss rate is not acceptable, step e) may include changing the priority of the transmission of continuous stream of data and repeating steps a) to d) above at the changed priority. Alternatively, step e) may include not initiating the transmission of the continuous steam of data.

Step e) may be carried out by the first node, by another node in the first network or by a human operator.

BRIEF DESCRIPTION OF THE DRAWINGS

For a better understanding of the present invention, reference will now be made, by way of example only, to the accompanying drawings in which.

DETAILED DESCRIPTION OF THE INVENTION

Figure 1:
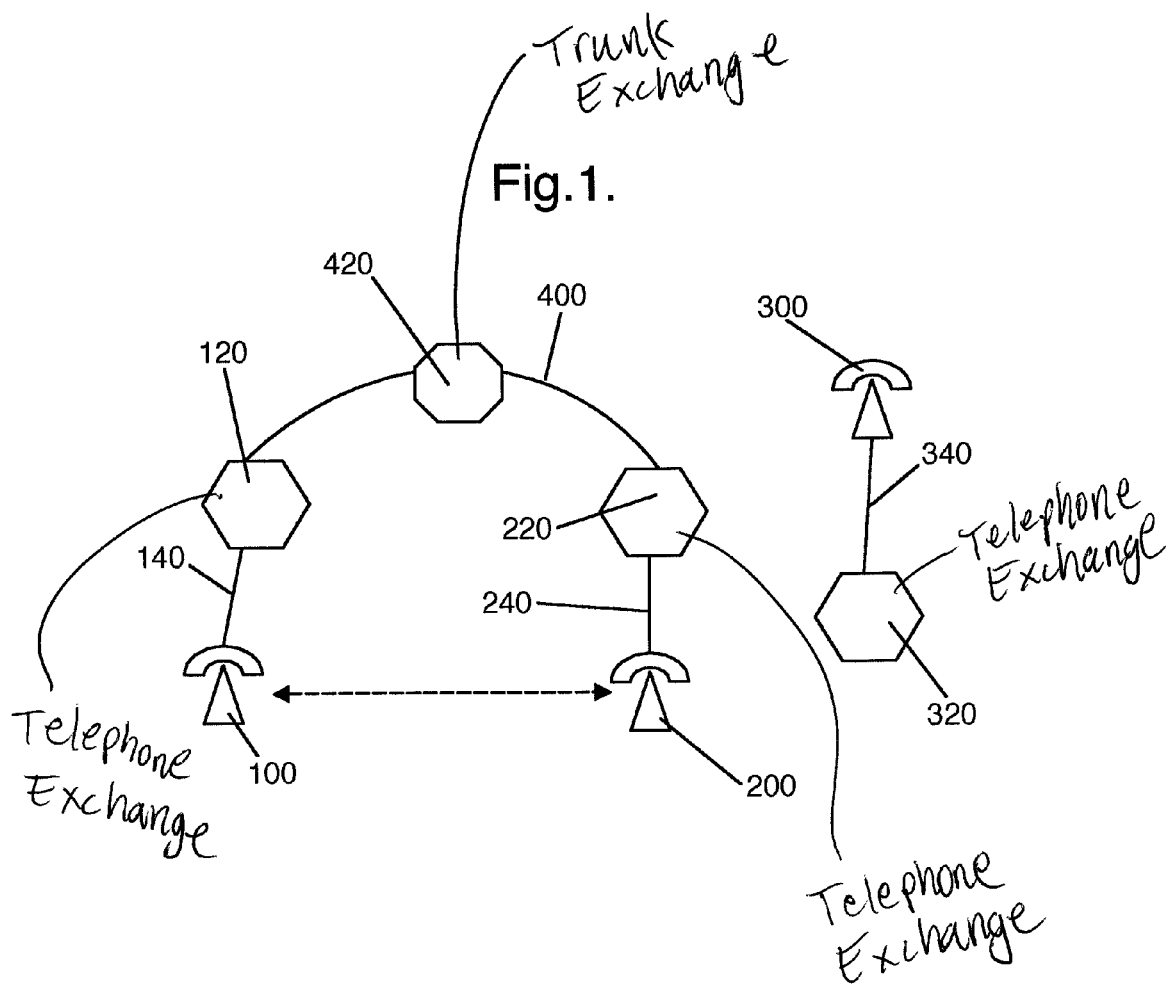
FIG. 1 illustrates a conventional circuit switched telephony network.

Referring initially to FIG. 1, a plurality of telephones 100, 200, 300 connected to respective local telephone exchanges 120, 220, 320 by respective lines 140, 240, 340. If a call is to be made between telephone 100 and telephone 200, the call must be routed via exchange 120, trunk connection 400 and exchange 220. Here, the trunk connection 400 includes a trunk exchange 420 which determines whether the call can be established.

Similarly, if a call is to be made between telephone 100 and telephone 300, it is routed from telephone 100 via exchange 120, a trunk connection (not shown) between exchange 120 and exchange 320, and exchange 320 to telephone 300.

Naturally, each exchange 120, 220, 320 has more than one telephone 100, 200, 300 connected to it and other trunk connections are provided between pairs of exchanges 120, 220, 320.

Figure 2:
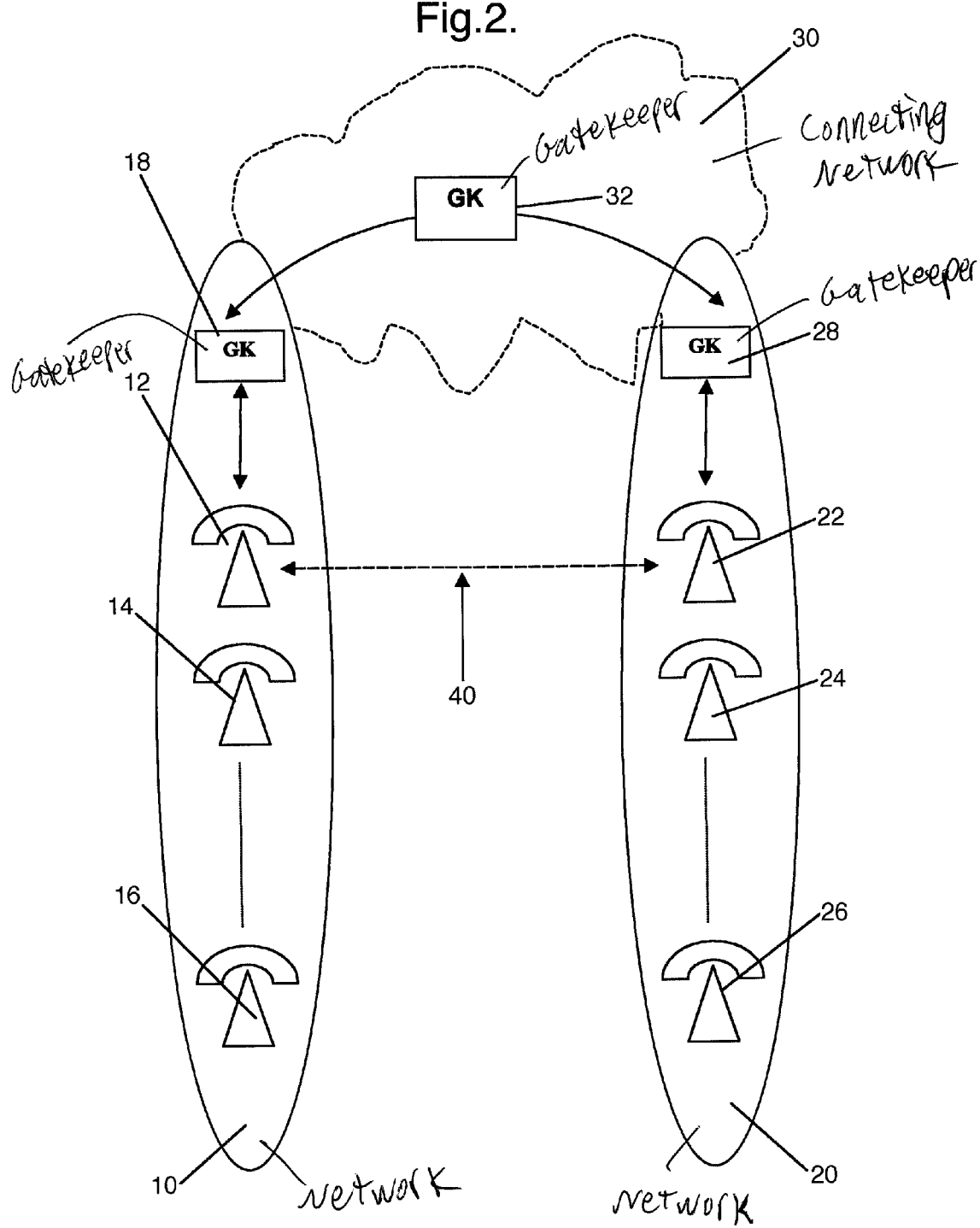
FIG. 2 illustrates a conventional IP telephony network.

Referring now to FIG. 2, two networks 10, 20 are shown which are connected to one another via a connecting network 30. Network 10 includes a plurality of telephones 12, 14, 16 and a gatekeeper 18 and network 20 includes a plurality of telephones 22, 24, 26 and a gatekeeper 28. Gatekeepers 18, 28 are known as "local" gatekeepers and each gatekeeper 18, 28 controls calls made into and out of its associated network 10, 20.

Although three telephones are shown in each network, it will be appreciated that the number of telephones in each network may be any suitable number in accordance with the application of the network. It will also be appreciated that one network may have a different number of telephones to the other network.

As shown, connecting network 30 also includes a gatekeeper 32 for controlling the calls routed through the network 30. Gatekeeper 32 is known as a "trunk" gatekeeper.

It will be understood that if telephone 12 in network 10 wants to make a call to telephone 22 in network 20, as indicated by the dotted arrow 40, the call is routed from telephone 12 to gatekeeper 18 for onward routing through the connecting network 30. In the connecting network 30, the call is routed through gatekeeper 32 and then to gatekeeper 28 in network 20 prior to being routed to telephone 22. At each gatekeeper 18, 32, 28, there is a possibility of the call being dropped if the bandwidth of the respective gatekeeper is not sufficient at the time the call is to be made.

Figure 3:
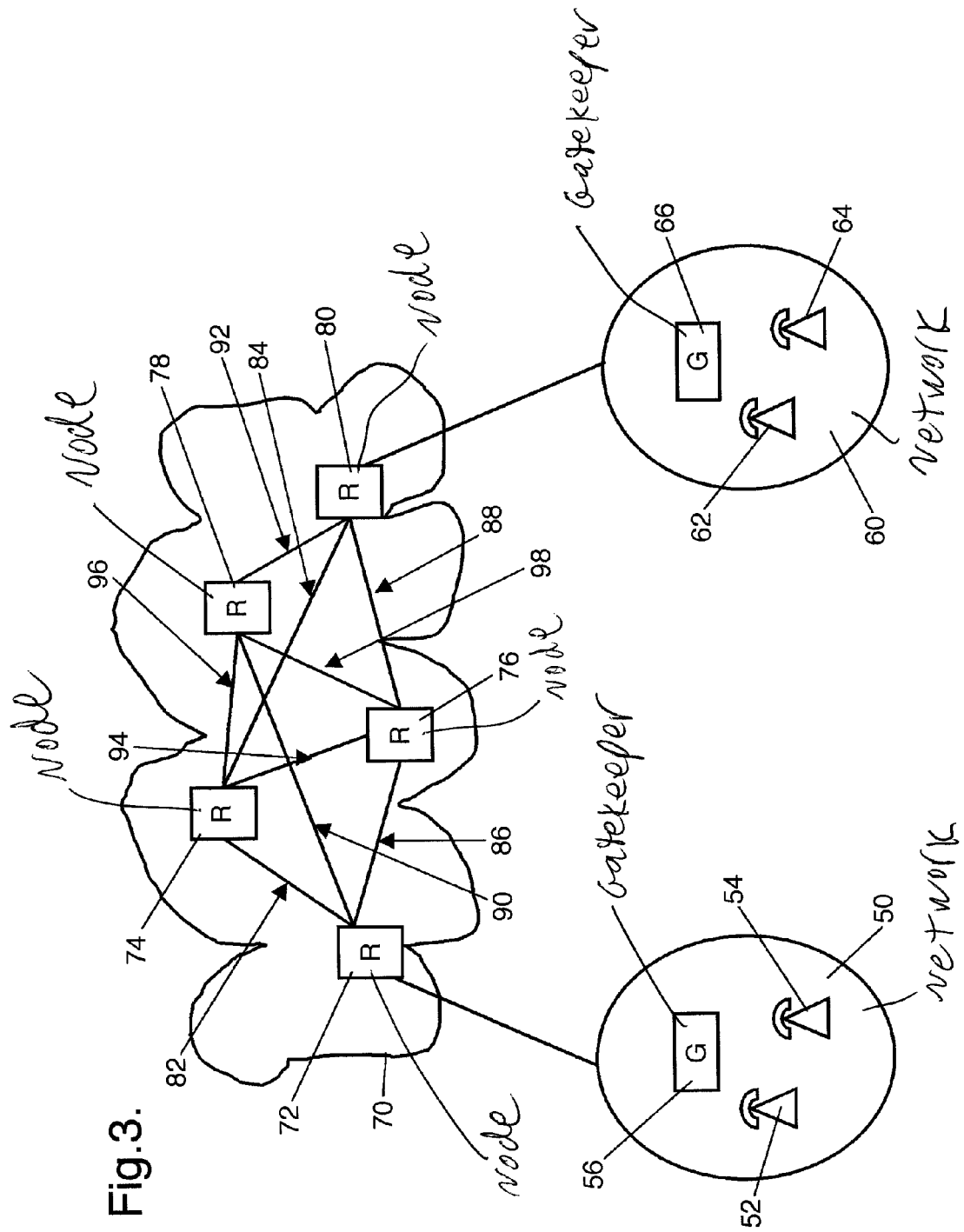
FIG. 3 illustrates an opaque trunk IP telephony in accordance with the present invention.

In FIG. 3, two networks 50, 60 are shown which are connected to one another via a connecting network 70. However, it will be appreciated that more than two networks may be connected to the connecting network 70, and only two networks 50, 60 are shown for clarity and ease of description.

Each network 50, 60 includes a plurality of telephones (although only two telephones 52, 54 and 62, 64 are shown for clarity). Each network 50, 60 also includes a respective gatekeeper 56, 66. It will be appreciated that networks 50, 60 are similar to networks 10, 20 of FIG. 2.

The connecting network 70 includes a plurality of routing nodes 72, 74, 76, 78, 80 for routing calls within the network 70 from one network 50, 60 to another. Each pair of nodes 72, 74, 76, 78, 80 is connected together by a link or connection. It is to be noted that not every node need be connected to each other node.

In the embodiment illustrated in FIG. 3, node 72 is effectively connected to network 50 and node 80 is effectively connected to network 60. Node 72 is also connected to nodes 74, 76 and 78 and node 80 is also connected to notes 74, 76 and 78. There is no direct connection between nodes 72 and 80 in the connecting network 70.

If a call is to be placed from telephone 54 in network 50 to telephone 62 in network 60, it is routed via gatekeeper 56 to node 72 in connecting network 70. As there is no direct connection between node 72 and node 80, the call may be routed to node 80 in one of several ways. For example, the routes may via the following nodes:

via node 74—links 82 & 84
via node 76—links 86 & 88
via node 78—links 90 & 92
via nodes 74 and 76—links 82, 94 & 88 (or links 86, 94 & 84 in the other direction)
via nodes 74 and 78—links 82, 96 & 92
via nodes 76 and 78—links 86, 98 & 92 (or links 90, 98 & 88 in the other direction)
via nodes 74, 76 and 78—links 82, 94, 98 & 92 (or other combinations of the same links dependent the direction)

It will be appreciated that, for each node through which a call is to be routed, there is a possibility of packets from the continuous stream of data comprising a call being lost depending on the available bandwidth in the link between each pair of nodes.

In FIG. 3, the networks 50, 60 comprise "local" networks which are controlled by the respective gatekeeper 56, 66. In this case, the connecting network 70 does not include a gatekeeper in the same way as FIG. 2. In effect, availability of bandwidth in the connecting network 70 is opaque to both local networks 50, 60 and can be considered to be an opaque "trunk" connection.

Whilst the present invention has been described with reference to calls being made from one telephone to another, it will be appreciated that the present invention is equally applicable to other types of traffic. Such traffic, for example, transmissions and communications, include management and signalling transmissions (rate limited), video transmissions and data transmissions. Traffic can be transmitted in the form of Internet Protocol (IP) packets. The traffic may comprise continuous streams of data and may be rate limited. Each packet may be encrypted for secure transmission in accordance with a suitable packet cryptograph. Encryption is carried out in the local network by the transmitting node or another node and/or another element (not shown) located within that network.

It will readily be appreciated that it is possible to prioritize traffic within an IP network so that certain types of traffic have particular priorities. It will also be appreciated that the priority of the traffic can be altered as required.

The issue of congestion only arises when there is insufficient bandwidth for a particular kind of traffic, either because link capacity is occupied by traffic of a higher priority, or because a link physically does not have the required bandwidth. Independent transmitters or nodes must detect congestion and individually react to it so as to reduce the load presented to the network and avoid "congestion collapse".

Congestion can arise in two ways:
1. A particular transmitter or node can start up, adding extra load to an adequately functioning network.
2. The bandwidth available in the network can change, either because of higher priority traffic being given preference or because of a routing change in the network, so that traffic is now carried over a lower capacity link.

In either case, the transmitter or node must implement a congestion avoidance scheme so as to allow as much traffic as possible at that priority level to successfully transit the network.

The vast majority of the data traffic will be transmitted using Transmission Control Protocol (TCP) which has extremely robust congestion behavior. TCP allows for the reliable transfer of data if there are no time constraints as it allocates the available bandwidth as fairly as possible. TCP uses "slow start" (TCP-slow start) to avoid putting a sudden extra load on the network when a transmitter or node first starts up and does not yet know what is an appropriate transmission rate. Data acknowledgements are used as the feedback mechanism by which the transmitter or node maintains the appropriate rate of transmission in the steady state. A transmitter or node gradually attempts to transmit faster and faster, but when congestion is detected it backs off rapidly (known as TCP-backoff). The result is that TCP transmitters or nodes can maintain a total load on a network that is very close to capacity, but when the available network bandwidth suddenly changes they adapt to it very rapidly.

Congestion management mechanisms of similar robustness must therefore be used for voice transmissions too, so as to avoid congestion collapse within a particular priority level used for transmission of continuous streams of data. To this end, three mechanisms can be implemented either in the phone in the local network or by the gatekeeper associated with the local network. In the mechanisms below, calls are transmissions of continuous streams of data in a packet switched network.

The first mechanism requires that telephones that have set up a call and are in voice (transmitting) will inspect the recent history of voice packets from the telephone to which they are connected. A packet loss rate of 10% is very hard for a subscriber to hear, so there is a considerable margin of detectable packet loss before the call will appear degraded to a subscriber. The decision of when to drop a call is based on the loss rate and the time for which the loss has been happening. In this case, because congestion is detectable earlier by a telephone than by its subscriber, it is possible to insert a recorded announcement that the call would be dropped due to network congestion and allow a grace period of a few seconds before the call was cut off. This happens while the call is of acceptable quality. Since the main reason for such congestion will be calls at a higher priority, such a mechanism should be highly acceptable to the users. From a human-factors point of view, it is also likely that users with less important calls or calls that have only recently begun would chose to clear them down themselves if there was a perceivable call degradation. This mechanism is equivalent to TCP-backoff described above.

In this mechanism, when a decision is made to drop a call, this information is relayed to the gatekeeper for statistical measurement. This enables an estimate of whether a call will be successful to be provided to the telephone when it attempts to set up a call.

The second mechanism requires that telephones which are setting up a call will send a trial burst of "ping" packets to the telephone which they are attempting to call before they send the signalling message which will cause the other telephone to ring. This "bandwidth probe" might use four or five ping packets of the same size and priority as the voice packets that will be used when the call is in voice but more closely spaced in time. This puts a link briefly into overload by sending a short duration but high bandwidth pulse. The effect of these pings on established voice calls will be small, but if a link is close to congestion some of these packets will either suffer increasing delays or be lost altogether. By analysing the returned packets, the telephone can decide how close to congestion the path to the other telephone is and consequently the probability that the call will be of acceptable quality if it is set up. The optimal number and spacing of these pings can be chosen in accordance with the requirements of a particular network or system. A suitable algorithm for assigning a call success probability based on the arrival and time of the returned packets can also be determined. Based on this estimated probability the telephone will then make a random decision as to whether to continue with the call or to clear it down. If it is decided to clear the call down, the subscriber can be presented with a message to the effect that the network path to that destination was congested and that they should try again later. This call admission mechanism is more cautious than the first mechanism so that existing calls continue in the face of slight congestion but new calls are not admitted. This mechanism is equivalent to TCP-slow start described above.

In this mechanism, the decision to either clear a call down or continue with the call is based on an acceptable packet loss rate for the particular transmission of continuous stream of data. It is possible to change the priority of the call to a higher priority if the packet loss rate is not acceptable. This change in priority tends to increase the success rate of the call being established.

The decision may be made by the telephone initiating the call, by another telephone or element in the same local network as initiating telephone, or by a human operator.

The third mechanism requires that a gatekeeper that is asked to set up a call will decide whether to allow even the initial trial burst to be used. On very heavily congested links where the offered call load is very much higher than the current capacity, the sum of the small transient loads from the initial bursts of many call attempts will be high enough to cause current calls in voice to be adversely affected and even dropped. However, by using statistics about the success or failure (and current loss rates) of calls to telephones controlled by other gatekeepers, the gatekeeper for a calling telephone can construct an estimate of loss probability for this new call. Based on this loss probability, the gatekeeper can make a random decision whether to permit even the initial trial burst of a call, or whether to stop it immediately. This mechanism has no equivalent in TCP but is very similar to "call-gapping" used in public telephone networks. "Call-gapping" operates to reduce the congestion by dropping call attempts very close to a calling subscriber when focussed overloads are detected. A focussed overload occurs when many people attempt to call a particular telephone number at the same time. When a call attempt is dropped, the caller is presented with an engaged tone.

It will be appreciated that, although each of the three mechanisms have been described as operating independently, it is possible to have all three operating on the same call. For example, the first mechanism indicates that a call can be continued based on recent call history of the telephone being called, the third mechanism determines if the trial burst of ping packets can be transmitted, and the second mechanism determines the packet loss rate for the path chosen by the connecting network between the local networks containing the calling telephone and the telephone being called.

By using the first two mechanisms, voice calls in a network of a few thousand subscribers should be handled appropriately under almost all congestion conditions. The reasons for call clear down will be apparent to the users so there should be little user frustration or spurious re-calling.

When the third mechanism is also used, the congestion handling should be extremely robust and even focussed overloads on low bandwidth congested links should be resisted well.

The invention claimed is:

1. A method of call admission control for a continuous stream of data in packet switched networks including at least two local area networks communicating to one another across a connecting network, the method comprising the steps of:
   a) transmitting a burst of trial data from a first telephone in a first local area network through the connecting network to a second telephone in a second local area network;
   b) reflecting the burst of trial data received at the second telephone back to the first telephone;
   c) receiving the reflected burst of trial data at the first telephone through the connecting network; and
   d) at the first telephone, comparing the reflected burst of trial data to the transmitted burst of trial data to determine whether transmission of the continuous stream of data can be initiated from said first telephone to said second telephone;
   wherein the burst of trial data is transmitted at a higher data rate than the packets to be transmitted on initiation of the continuous stream of data.

2. A method according to claim 1, wherein step a) includes selecting a path through the connecting network, the path being determined by the connecting network.

3. A method according to claim 1, wherein the burst of trial data is the same size as the packets to be transmitted in the continuous stream of data.

4. A method according to claim 1, wherein step d) includes comparing the number of packets in the transmitted burst of trial data and the reflected burst of trial data, and calculating an estimate of packet loss rate of the path.

5. A method according to claim 4, wherein multiple bursts of trial data are transmitted to improve the estimate.

6. A method according to claim 1, further comprising:
   e) deciding to transmit packet data based on an acceptable packet loss rate for the transmission of the continuous stream of data.

7. A method according to claim 1, wherein the packet loss rate is not acceptable and the method includes not initiating the transmission of the continuous stream of data.

* * * * *